Jan. 9, 1968   E. F. IANNONE ET AL   3,362,692
CONTAINER WITH STIRRING MEANS
Filed Jan. 13, 1966
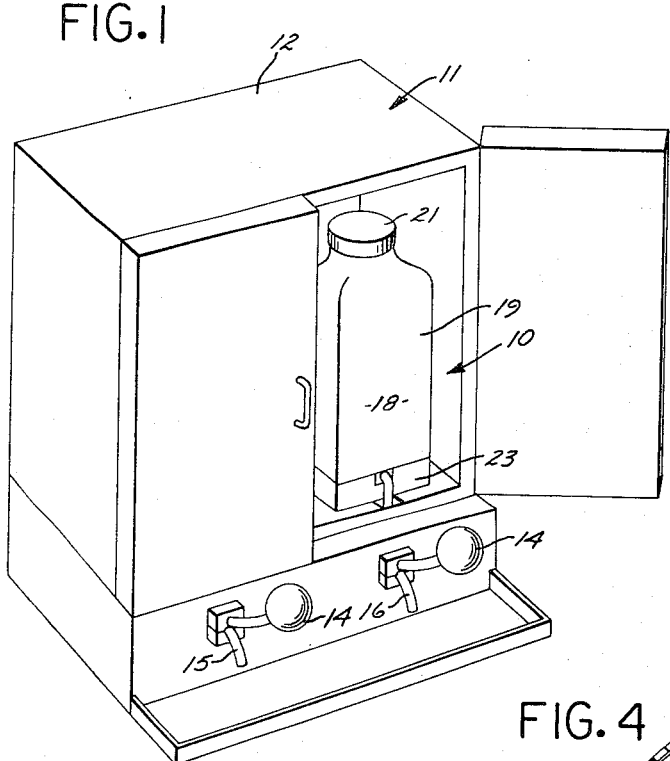
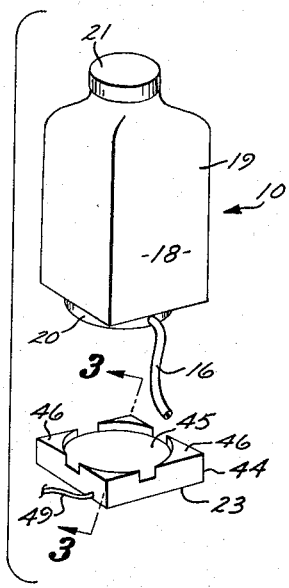
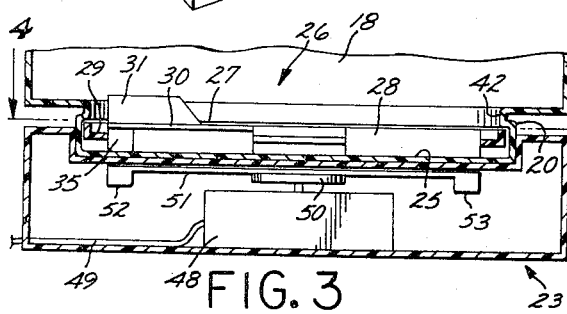
INVENTORS.
EDMUND F. IANNONE
HENRY F. FOUST
WOODROW W. HOLDER
BY Noel L. Conway
ATTORNEY 3,362,692
CONTAINER WITH STIRRING MEANS
Edmund F. Iannone, 12115 Clearglen Ave., Whittier, Calif. 90604; Henry F. Foust, 13381 Flint Drive, Santa Ana, Calif. 92705; and Woodrow W. Holder, 421 N. Hill, Whittier, Calif. 90601
Filed Jan. 13, 1966, Ser. No. 520,529
9 Claims. (Cl. 259—111)

This invention relates to containers having provision for stirring the contents thereof and more particularly to apparatus wherein there are provided replaceable containers which are used in combination with a power input unit for operation of stirring means within the container.

A principal use for embodiments of the present invention is in storing and dispensing liquids such as orange juice from relatively large, e.g., five-gallon, refrigerated cans. In the past, five-gallon cans of milk have been located in a refrigeration unit in a restaurant. And then, at such time as desired, portions of the milk are drained from the can into the glass for service to the customer. A practical problem arises in the connection with storage of orange juice in such containers for dispensing in individual portions. More particularly, the solids in the orange juice tend to settle with the obvious adverse results. While the problem of settling can be overcome by stirring the orange juice in the container, there is a considerable problem in providing a storing means which not only accomplishes the objective, but is cheap to manufacture and inexpensive to clean—thereby reducing the cost of use.

Embodiments of the present invention accomplish this by provision of paddle means within the container, which paddle means are constructed such that there need be through the container shell no shaft or other means by which power to operate the paddle means is transferred from the exterior of the container to the interior of the container. Further, the paddle means are constructed so that, after use, the container may be turned upside down and hosed out to be easily cleaned.

With the foregoing in mind, it is a major object of this invention to provide an improved container having stirring means.

Another object of this invention is to provide a container for use with a power input unit, which power input unit supplies the power to operate stirring means in the container.

A further object of this invention is to provide a container having stirring means, which container may be manufactured at a low cost and easily cleaned.

It is still another object of this invention to provide a container having stirring means which is powered from an external source, but which does not require mechanical transmission of the power through the shell of the container.

It is still a further object of this invention to provide a container having stirring means operable in connection with an external power unit, which power unit has a housing which cooperates with the container to properly index the container relative to the power input unit.

Other and further objects of this invention will become apparent in the detail description below in connection with the attached drawings wherein:

FIG. 1 is a perspective view of a preferred embodiment of the invention disposed in a typical refrigeration unit;

FIG. 2 is a view of the replaceable container of FIG. 1 displaced somewhat from the power input unit of the combination;

FIG. 3 is an enlarged cross-sectional view of the lower portion of the container-power input unit combination taken along line 3—3 in FIG. 2;

FIG. 4 is an enlarged cross-sectional plan view of the lower end of the container taken along line 4—4 in FIG. 3;

FIG. 5 is an enlarged fragmentary cross-sectional view of the container and power input unit disclosing the means for magnetically coupling the power unit to the paddle means, taken along line 5—5 in FIG. 4;

FIG. 6 is an enlarged fragmentary cross-sectional view of one of the paddles taken along line 6—6 in FIG. 4; and, FIG. 7 is a fragmentary cross-sectional view of a portion of the other paddle taken along line 7—7 in FIG. 4.

Referring now to FIG. 1, there is shown a container-power input unit combination of the present invention, indicated generally by the arrow 10, located in a conventional refrigeration unit indicated by the arrow 11. The refrigeration unit 11 has a housing 12 with a pair of doors on the front thereof to gain access to the interior. The refrigeration unit 11 is further defined by weight actuated shutoff valves 14 which function to selectively squeeze off flow through plastic tubings 15 and 16 extending through holes operably associated with the shutoff valves. More particularly, when the weight at the end of one of the valves 14 is raised, fluid may flow through the particular tubing passing right below the valve handle. Then when the operator releases the weight, the weight forces a mechanical member within the valve housing downwardly pinching off flow through the tube.

It will also be noted that the flexible tube 16 communicates with the interior of container 18 at the bottom of the container. Thereby, when the container 18 is located on the power unit 23 in the refrigeration unit 11, the tube 16 may be fed down through the hole which is part of the shutoff valve 14 for dispensing in individual porions. In practice, the flexible tube 16 would be sealed when it is received by the restaurant operator. Then, after installation, in the refrigeration unit and insertion of the tube 16 through the hole of the shutoff valve 14, the sealed end of the tube is cut off.

Referring now to FIG. 2 in addition to FIG. 1, the container 18 is preferably molded of plastic. The shell of the container 18 defines a square body portion 19 with a round bottom portion 20 at its lower end and a removable cap 21 at its upper end for purposes of cleaning and refilling the container.

As will be described in greater detail below, the container 18 has within it a paddle means for stirring the contents of the container. However, the paddle means does not have its own power, and accordingly, the container 18 is used in combination with a power input unit 23 for activation of the paddle means. The details of construction and operation of the power input unit 23 will be described in greater detail below.

Referring now to FIGS. 3 to 6, the preferred embodiment of the invention will be described in further detail. Resting on the bottom 25 of the container 18, there is a paddle means, indicated generally by the arrow 26, for accomplishing the stirring action. The paddle means 26 includes a first paddle 27 and a second paddle 28 which are joined together by a guide ring 29. For purposes described below it is preferred that the guide ring 29 be resilient. Preferably, the entire paddle means are made of a semi-flexible plastic.

In the particular structure disclosed, the paddle 27 comprises a plate 30 which is secured to the guide ring 29 and extends inwardly toward the center of the ring. At its leading edge (when the paddle means is being rotated) the plate 30 has a face for directing the orange juice (or other material in the container) toward the other paddle of the paddle means 26. To this end, outer portion 31 of the face of the first paddle 27 is curved ahead of inner portion 32 of said paddle. Further, at the outer portion 31, the face of the paddle is much more perpendicular than toward the center.

As will be described in greater detail below, there is provided in the particular power input unit 23 illustrated, a pair of magnets which are rotated in a circle immediately below the bottom 25 of the container 18. Further, in order to transmit this rotary motion to the paddle means 26 within the container 18, there must be some magnetic field responsive means operatively connected to the paddle means. It is preferred that such magnetic field responsive means be a pair of permanent magnets. Accordingly, there is provided a magnet housing 35 on the underside of the plate 30, which housing contains therein a permanent magnet 36.

The second paddle 28 comprises a plate 37 secured to the guide ring 29 at a position thereon generally opposite the first paddle 27. Contrasted to the paddle 27, the paddle 28 is provided with a leading edge 38 which is inclined across the entire width of the paddle 28. Further, the leading edge 38 extends substantially on a radial line from the center of the paddle means 26. Accordingly, with the rotation of the paddle means 26, the paddle 28 directs the contents in the container upwardly.

With the above described relation of the paddles 27 and 28 of the paddle means 26, the paddle 27 tends to direct the orange juice toward the paddle 28 and then the paddle 28 directs the orange juice upwardly, thus augmenting the mixing operation.

As in the case of the paddle 27, the paddle 28 has a magnet 40 on the under side of the plate 37, contained within a housing comparable to the housing 35. The under side of these last mentioned housings support the weight of the paddle means 26, i.e., the paddle means rides during rotation on these housings.

In addition to the easy cleaning and low cost manufacture afforded by the construction of the paddle means 26, it is preferred that the paddle means 26 remain in the bottom portion 20 of the container during the time that the container 18 is upside down being cleaned. On the other hand, it is also desirable that the paddle means 26 be easily installed and removed. To this end, a retainer ring 42 is formed at the junction of the bottom portion 20 of the container 18 and the square body portion 19 of the container. The retainer ring 42 is provided by a portion of the shell, or wall, of the container 18 being displaced inwardly during the molding process. As mentioned above, the guide ring 29 is made out of a resilient material. Therefore, the paddle means 26 may be installed by bending the guide ring 29 at the portions between the first and second paddles 27 and 28. In order to remove the paddle means 26, one need merely grasp the second paddle 28 and pull it toward the center of the bottom 25 and then upwardly away from the bottom. As mentioned above, the container 18 (and paddle means 26 therein) is replaceable. That is, the orange juice is delivered in the container 18 and placed on top of the power input unit 23 in the refrigeration unit 11. Then, after the orange juice is sold, the old container is replaced by a new full one. However, the power input unit 23 remains in the refrigeration unit.

The power unit 23 includes a housing 44 which is also preferably made of plastic and is completely closed for easy cleaning. As can best be seen in FIG. 2, the housing 44 has a circular recessed area 45 at the upper side thereof, which area provides for upstanding posts 46 at the corners of the square housing. The posts 46 serve to hold the container 18 from sliding off the power unit 23 and also serve to index the container relative to the power unit for a purpose to be described below. It should also be noted that the square power unit housing 44 blends to the configuration of the square body portion 19 of the container 18.

Disposed within the housing 44 there is a motor 48 which receives electrical power from a source (not shown) through an electrical wire 49. Through a gear-head within the motor box, the speed of the motor is reduced so that turntable 50 is rotated at, e.g., approximately 6 revolutions per minute. Secured to the turntable 50 is a cross arm 51 which has molded at the ends thereof magnet buckets 52 and 53. Each of said buckets 52 and 53 carries a magnet 55 moving along the underside of the recessed portion 45 of the housing 44. It will be noted that the magnet 55 (see FIG. 5) is not completely enclosed as in the case of the magnet 36. This is because, contrasted to the condition of the container 18, there is no problem of cleaning or contamination.

In operation, the power unit 23 remains in the refrigeration unit 11 at all times. Then, the full container 18 of orange juice is positioned on top of the power unit with the posts 46 retaining and indexing the lower portion 20 of the container 18. The posts 46 index the lower portion 20 of the container such that it is centered on the axis of rotation of the turntable 50 and therefore the magnets 55 in the magnet buckets 52 and 53. The guide ring 29 generally centers the paddle means 26 on the bottom 25 of the container. Therefore, with the bottom portion 20 of the container 18 thus indexed, the paddle means 26 is aligned with the axis of rotation so that the magnets 55 are rotating in the same circle as the magnets 36 and 40 although the magnets 55 are slightly below the plane of rotation of the magnets 36 and 40. Since only two relatively thin pieces of plastic separate the magnets, the magnets 36 and 40 will be attracted to the magnets 55 and will start rotating with the latter magnets as the turntable 50 is rotated. Thereby, the contents of the container 18 may be continuously stirred during the period of time that the contents are being dispensed on an individual basis.

After the container 18 is empty, the container is removed and replaced by a full container. At that time, the empty container is taken to a place where it may be cleaned by being turned upside down and hosed out and otherwise sterilized.

While only a few embodiments of the present invention have been shown and described in detail, it will be apparent to those skilled in the art that such is by way of illustration only, and numerous changes may be made thereto without departing from the spirit of the present invention. For example, metal slugs could replace the magnets 36 and 40. Also, electromagnets could replace the permanent magnets 55. Further, the container could be constructed of a magnetic field responsive material, e.g., steel, at those portions other than where the magnetic coupling is accomplished. And the paddle means 26 could take other shapes without requiring complicated structure for mechanically transmitting power through the wall or bottom of the container. Accordingly, the invention is to be limited by the following claims.

I claim:

1. A container with stirring means comprising:
    a container having a shell, a portion of the shell of the container being of non-magnetic material;
    paddle means located at the bottom of the container for stirring the contents of the container when said paddle means is activated; guide means on said paddle means cooperating with said container shell for loosely retaining the paddle means in the bottom of the container;
    and magnetic field responsive means operatively connected to said paddle means and disposed entirely within said container and adjacent to said shell portion, said magnetic field responsive means being adapted to receive power from a power input means located adjacent to said shell portion for activating the paddle means.

2. The invention set forth in claim 1 wherein said guide means is a ring on the periphery of said paddle means and the wall of the container shell just above the ring projects inward for engaging said ring for retaining the paddle means.

3. The invention set forth in claim 2 wherein said paddle means comprises:

a first and a second paddle, said first paddle being shaped so as to direct the contents of the container toward the other paddle when the paddle means is activated, said second paddle shaped so as to direct the contents of the container upward when said paddle means is activated.

4. The invention set forth in claim 1 wherein said magnetic field responsive means includes:

a plurality of magnets located resting on the bottom of the container, said magnets being spaced from the center of the container bottom, and said container bottom is siad non-magnetic shell portion.

5. The invention set forth in claim 1 including:

a housing;

power input means located within said housing adjacent to said shell portion for activating said paddle means, said power input means including magnetic field means rotatable about a predetermined axis, said magnetic field means being positioned adjacent to said magnetic field responsive means so that a magnetic field means will cause the magnetic field responsive means to rotate with the magnetic field means;

and power means for causing said magnetic field means to rotate about said predetermined axis.

6. The invention set forth in claim 5 wherein said shell portion is at the bottom of the container, and said paddle means rotates around the same axis as said magnetic field means with the latter when the latter is rotated, said magnetic field means includes at least one magnet displaced from said axis and rotatable about said axis in a plane parallel to and adjacent the container bottom, and said magnetic field responsive means is located at a point substantially the same distance from the axis.

7. The invention set forth in claim 5 including:

means on said housing and container cooperating to index the container relative to the housing to align the magnetic field responsive means with the magnetic field means.

8. A container with stirring means comprising:

a container having a bottom with a wall extending upwardly therefrom, and inwardly projecting retainer portion on said container wall spaced a short distance above said bottom;

paddle means removably located in the bottom of the container for stirring the contents of the container when the paddle means is activated, said paddle means including:

a circular guide ring having a diameter slightly smaller than the lateral dimensions of the bottom of the container, said ring being engageable with the retainer portion whereby the latter retains the paddle means in the bottom of the container, said paddle means including two paddles fixed to the guide ring at separate points thereon and extending toward the center of the bottom of the container, the portions of the guide ring connecting the points at which the paddles are connected being resilient to permit bending of the guide ring for installing and removing the paddle means around said retainer portion;

and magnetic field responsive means connected to said paddle means and disposed entirely within said container for receiving power through the bottom of the container via a magnetic field.

9. In combination with the invention set forth in claim 8, power input means comprising:

a housing on which is sitting the container;

magnetic field means located within said housing;

means for rotating said magnetic field means about a predetermined axis extending up through the center of the container, whereby rotation of the magentic field means causes the paddle means to be activated.

References Cited
UNITED STATES PATENTS

| | | | |
|---|---|---|---|
| 2,459,224 | 1/1949 | Hendricks | 259—108 |
| 2,549,121 | 4/1951 | Osterheld | 259—108 |
| 2,951,689 | 9/1960 | Asp et al. | 259—144 |
| 3,168,294 | 9/1965 | Hasumura | 259—108 |

ROBERT W. JENKINS, *Primary Examiner.*